Sept. 24, 1940.  W. T. DUNN  2,215,690
CLUTCH
Original Filed July 15, 1935   2 Sheets-Sheet 2
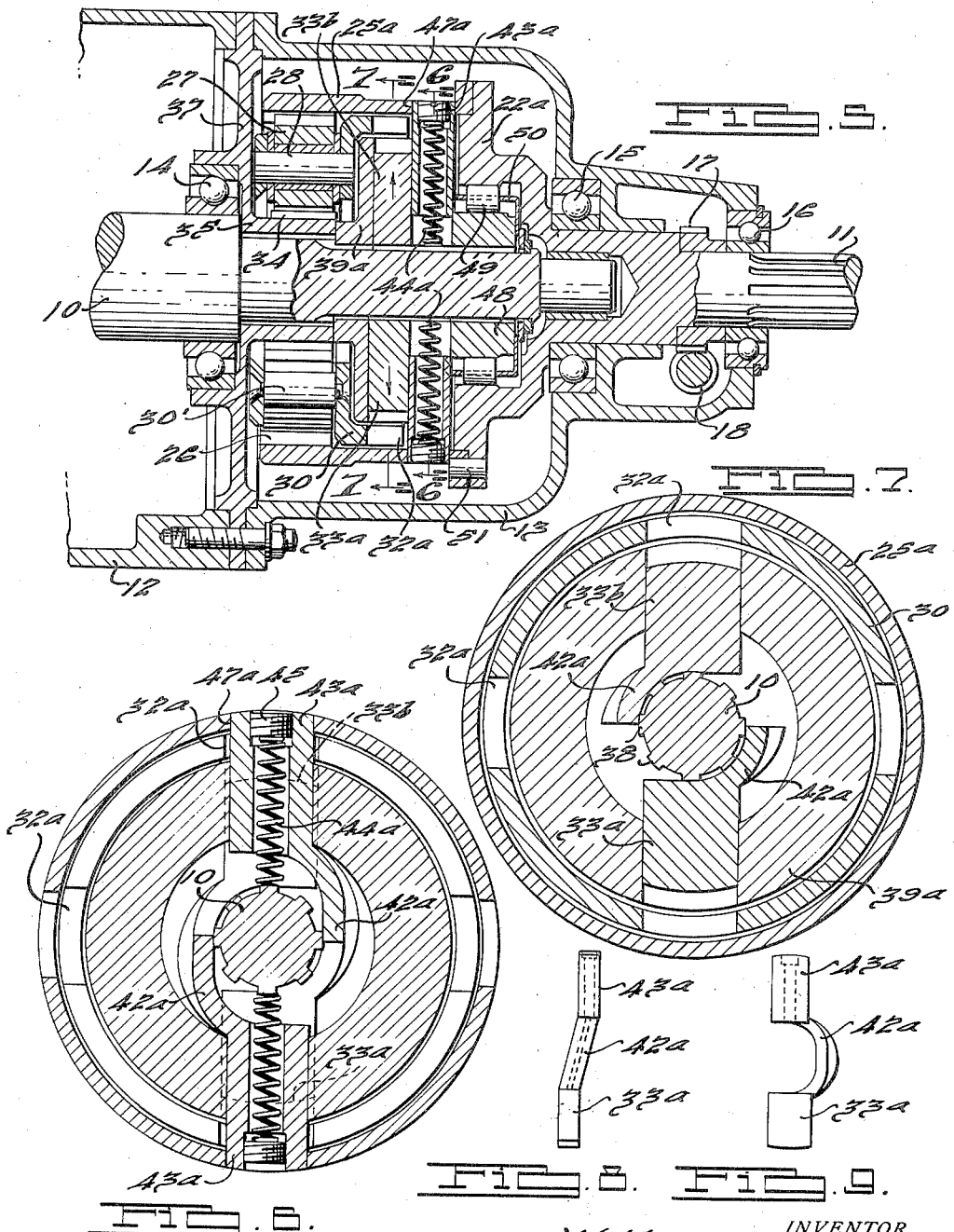
INVENTOR
William T. Dunn.
BY
Harness, Dind, Patee & Harris
ATTORNEYS.

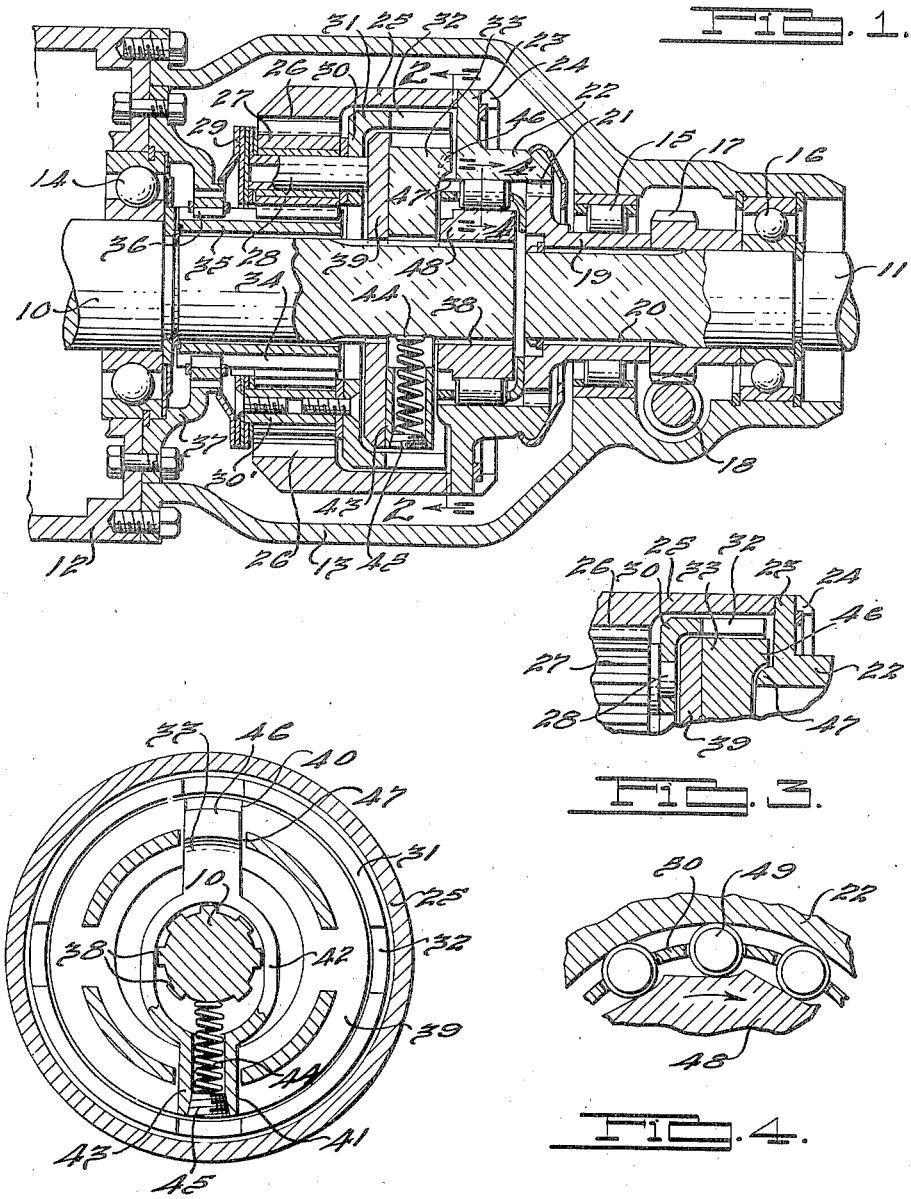

Patented Sept. 24, 1940

2,215,690

UNITED STATES PATENT OFFICE 2,215,690

CLUTCH

William T. Dunn, Detroit, Mich., assignor to Chrysler Corporation, Highland Park, Mich., a corporation of Delaware Original application July 15, 1935, Serial No. 31,320. Divided and this application May 22, 1939, Serial No. 275,038

13 Claims. (Cl. 192—105)

This invention relates to power transmission and refers more particularly to improvements in speed ratio changing mechanism especially adapted for use in driving motor vehicles.

This application is a division of my copending application Serial No. 31,320, filed July 15, 1935, now matured as Patent No. 2,182,427.

One object of my invention is to provide an improved speed ratio changing mechanism preferably providing an overdrive, or a speed ratio greater than 1 to 1 between driving and driven shafts in the transmission of power from the engine to the vehicle ground wheels.

More particularly, further objects of my invention are to provide a mechanism of the character aforesaid having improved characteristics of long life, quietness of operation, automatic response to the speed of vehicle travel, and relatively low cost.

Another object of my invention is to provide an automatic overdrive mechanism between driving and driven shafts incorporating releasable means in the normal direct drive between the shafts and wherein the releasable means provides a two-way direct drive prior to the synchronizing action of the members of the automatic clutch; also releasable means for the normal direct drive which may pass through a movable part of the automatic clutch which controls the overdrive gear train.

A further object of my invention is to provide an improved arrangement of planetary gearing for the overdrive gear train, this gear train being controlled by an automatic clutch of the centrifugal force operated type.

Further features of my invention reside in an improved clutch for controlling an overdrive; also an improved clutch having one or more centrifugal force operated elements adapted to provide a direct drive connection or a control therefor between the driving and driven shafts as well as the overdrive connection or a control therefor.

A further object of my invention is to provide an automatic overdrive adapted to function in controlling the drive with a minimum of manual control.

Further objects and advantages of my invention will be more apparent from the following detailed description of several illustrative embodiments of my invention, reference being had to the accompanying drawings in which:

Fig. 1 is a sectional elevational view of my overdriving mechanism.

Fig. 2 is a transverse sectional elevational view taken approximately as indicated by the line 2—2 in Fig. 1.

Fig. 3 is a fragmentary sectional elevational view of the parts shown in Fig. 1 but illustrating the clutching element in a different position of its movement.

Fig. 4 is a detail sectional elevational view taken as indicated by the line 4—4 of Fig. 1.

Fig. 5 is a view corresponding to Fig. 1 but illustrating a modified form of my overdriving mechanism.

Figs. 6 and 7 are respectively transverse sectional views taken as indicated by the lines 6—6 and 7—7 of Fig. 5.

Fig. 8 is a side elevational view on a reduced scale illustrating one of the clutching elements.

Fig. 9 is a side elevational view of the clutching element illustrated in Fig. 8.

Referring to the drawings, I have illustrated my overdriving mechanism operating between a power driving shaft 10 and a driven shaft 11. These two shafts may be arranged anywhere along the line of power transmission between the usual engine and driving ground wheels of the motor vehicle and inasmuch as such parts are well known, I have not illustrated them in my drawings. The shaft 10 preferably receives its drive from the usual change speed transmission mechanism which may be located in the casing 12 to the rear of which is located the casing 13 for housing the overdrive mechanism.

Shaft 10 is suitably rotatably journalled, one bearing therefor being shown at 14 while shaft 11 is rotatably journalled by bearings 15 and 16, the usual speedometer drive being taken from shaft 11 by the gearing 17 and 18 in a well known manner.

The driven shaft is provided with an enlarged forward extension coaxial with the aligned axes of shafts 10 and 11 and surrounding the rear end of shaft 10 and while this enlarged projection may be formed integrally with shaft 11 such structure is preferably built up for convenience of manufacture as follows: A hub 19 is drivingly secured to shaft 11 by the splines or teeth 20, this hub being drivingly engaged as by the teeth 21 with the cylindrical member 22. This latter member has a plurality of circumferentially spaced radial projections 23 adapted to fit into rearwardly extending slots 24 of a cylindrical driving member 25 formed at the forward end with an internal gear 26 meshing with a plurality of circumferentially spaced planetary gears 27 mounted on axles 28 connected by the ring-like carriers 29 and 30. These carriers may also be connected intermediate a pair of the planetary gears by suitable spacing structures 30' and the carrier 30 is provided with a rearwardly extending driving member in the form of a cylindrical portion 31 thereof having a plurality of circumferentially spaced slots 32 adapted for clutching engagement with the centrifugal force operated clutching element 33 as will be presently more apparent. The driving member 25 transmits a drive from driven shaft 11 to internal gear 26 prior to the overdrive from driving shaft 10 to driven shaft 11 as will presently be more apparent. When the overdrive is established, with the engine driving the vehicle, the driving member 25 transmits the drive from internal gear 26 to driven shaft 11.

The planetary gears 27 also mesh with a sun gear 34 carried by a sleeve 35 freely surrounding shaft 10 and non-rotatably secured by teeth 36 with a bracket 37 secured to the stationary casing 12.

The rear end of shaft 10 is provided with splined teeth 38 for drivingly engaging a cage 39 adapted to carry the clutching element or pawl 33 whereby the latter is rotated with the cage and capable of radial movement relative thereto in the cage guides 40 and 41. The pawl 33 has an inwardly extending yoked portion 42 surrounding shaft 10 and terminating in a diametrically opposite end portion 43 adapted to house a spring 44 acting between shaft 10 and an adjustable abutment groove plug 45 threaded in the outer end of the end portion 43. The spring 44 acts to yieldingly urge the pawl 33 into the position illustrated in Fig. 2, the shaft 10 serving to limit the movement of the pawl in this direction which is the disengaged position of the pawl with respect to its clutching position with one of the slots 32.

The pawl 33 is provided with a rearwardly extending projection 46 adapted, when the pawl is in its retracted position, to register with one of the circumferentially spaced slots 47 formed in the forwardly extending face of the cylindrical driven member 22, the arrangement being such that when the pawl 33 moves outwardly under centrifugal force, the pawl projection 46 will first be released from the slot 47 just prior to movement of the pawl into one of the clutching slots 32 of the carrier 30, such intermediate position being illustrated in Fig. 3.

The pawl 33 is adapted for clutching engagement with a slot 32 when the rotational speeds of the pawl and slot are substantially synchronized and in order to facilitate this synchronizang action at the time of clutching engagement of pawl 33, I preferably provide a releasable clutch between the driving and driven shafts to permit at least a certain amount of relative movement between shafts 10 and 11 at the time of clutching engagement. A releasable clutch in the form of a roller clutch such as is commonly used in free wheeling devices will be satisfactory for this purpose in order to permit the driven shaft to overrun the driving shaft for synchronizing the clutching element 33 with a slot 32. This overrunning clutch comprises an outer cylindrical clutching portion provided by the aforesaid part 22 and an inner cam member 48 drivingly connected to shaft 10 through the splines 38, the intermediate rollers 49 acting between the clutch portions 22 and 48 and being maintained in their properly spaced relationship by a spacer ring 50.

In the operation of my driving mechanism, and with the parts positioned as illustrated in Figs. 1, 2 and 4, it will be apparent that the drive passes from shaft 10 to shaft 11 as a direct two-way drive through the intermediary of pawl 33 by reason of the engagement with the pawl projection 46 in slot 47 of driven member 22. A forward drive supplementing the drive through the pawl is also effected tending to take at least a part of the forward drive for minimizing the friction on pawl 33 by reason of the rollers 49 being wedged between the driving cam member 48 and the outer member 22 driven thereby. It will thus be apparent that this two-way drive will permit a reverse drive between shafts 10 and 11 without any further manual control on the overrunning clutch and if desired the overrunning clutch may be dispensed with in certain circumstances although it is preferred to incorporate a releasable clutch of some form for operation at least during the synchronizing clutching engagement of pawl 33 with slot 32.

When the vehicle is driven at or above a predetermined desired speed for automatic clutching action of the overdrive, such action being determined by the resistance of spring 44 and the adjustment by the screw plug 45, the pawl 33 will fly outwardly to release the driving connection between pawl portion 46 and slot 47 as shown in Fig. 3. At this time the slot 32 is being driven at a slower speed than that of the pawl 33 by reason of the planetary gearing acting as a reduction train between the driven shaft 11 and the planetary carrier 30 so that by momentarily slowing down the speed of the driving shaft as by a momentary release of the accelerator pedal, the rotational speeds of the pawl 33 and slot 32 will quickly approach synchronization at which time the pawl 33 will quickly move outwardly into the slot 32 to provide a positive driving connection between driving shaft 10 and planetary carrier 30. The drive will then pass from driving shaft 10 through cage 39 and pawl 33 to the carrier 30, the drive acting through the planetary gearing to the driven shaft 11 effecting an overdrive in a ratio depending on the value of the planetary gear train as will be readily understood.

When the pawl 33 has moved outwardly sufficiently to release its driving connection with the driven shaft 11, thereby occupying what may be termed an intermediate position just prior to synchronization with the rotational speed of the planetary carrier 30 as shown in Fig. 3, the shaft 11 is not entirely without a drive from the shaft 10 inasmuch as such a drive is provided by the rollers 49.

Whenever the motor vehicle is driven at a speed under the critical speed of clutch engagement sufficiently to permit the spring 44 to urge the pawl 33 inwardly, the pawl will release its engagement with slot 32, rollers 49 providing an overrunning action between shaft 11 and shaft 10, and by increasing the speed of shaft 10 relative to shaft 11 the pawl 33 may be synchronized with the speed of the driven shaft whereupon the pawl will move further inwardly to again register the pawl projection 46 with one of the slots 47 drivingly carried with the driven shaft to restore the mechanism to the Fig. 1 position.

It will be understood that there is ordinarily a certain amount of friction resisting the movement of pawl 33 from its extreme positions so that when movement of the pawl takes place further movement in the same direction will also readily take place to either completely clutch the pawl with a slot 32 on outward movement of the pawl or else completely clutch the pawl projection 46 with one of the slots 47 on inward movement of the pawl.

In Figs. 5 to 9 I have illustrated a somewhat modified arrangement of parts primarily consisting in an automatic clutch having a pair of centrifugally operated elements which are adapted for clutching engagement with slots provided in the cylindrical member of the internal gear to provide the direct two-way drive between the driving and driven shafts or at least a portion of such drives or where parts of this mechanism are substantially the same in construction and operation as those aforesaid, I have used similar reference numerals.

In this modified arrangement the driven shaft 11 is integrally formed with the outer cylindrical portion 22ª of the overrunning clutch and connected by members 51 to the cylindrical portion 22ª is the cylindrical driving member 25ª of the internal gear 26. The cylindrical member 25ª in this instance is formed with a series of circumferentially spaced slots 47ª adapted to receive an end portion 43ª of a pawl or centrifugal element 33ª and 33ᵇ. Prior to clutching movement of the pawls, each pawl is yieldingly urged by a spring 44ª to maintain the pawl end portions 43ª in engagement with one of the slots 47ª and when the rotational speed of the pawl cage 39ª is sufficient to cause the pawls to move outwardly against springs 44ª, then the ends 43ª will move inwardly from the slots 47ª and the opposite ends of the pawls will then register with the slots 32ª of the planetary carrier 30 when the planetary carrier and pawls are substantially synchronized as to their rotation speeds.

It will be noted from Fig. 5 that the slots 32ª and 47ª are spaced axially with respect to each other in the direction of the axis of the driving and driven shafts 10 and 11, each pawl having its opposite end portions relatively offset in the direction of said axis so that corresponding end portions of the pawls will lie in a plane containing the slots 32ª and the slots 47ª. Thus, each pawl has an intermediate portion 42ª connecting its end portions and this intermediate portion partially surrounds the driving shaft 10 and also extends longitudinally of the axis of shaft 10 so that the pawls will nest with each other, adjacent end portions of the pawls being in slidable contact as shown in Fig. 5.

The operation of the mechanism illustrated in Figs. 5 to 9 is substantially the same as in the foregoing embodiment of my invention, it being apparent that with the parts positioned, as illustrated in the drawings, a two-way direct drive will take place between shafts 10 and 11 through the intermediary of the pawls 33ª and 33ᵇ supplemented to some extent by the rollers 49, the slots 32ª being freely driven from the driven shaft 11.

When the motor vehicle is driven at a predetermined desired speed the centrifugal force will act to move the pawls outwardly causing the pawl end portions 43ª to move inwardly against the associated spring 44ª and thereby disengaging the pawls with the slots 47ª to release the two-way direct drive. At this point in the operation the direct drive between shafts 10 and 11 may, of course, be continued through the overrunning clutch rollers 49 although the mechanism is now in condition for effecting the overdrive upon slowing down the shaft 10 relative to shaft 11 to synchronize the rotational speeds of the pawls and slots 32ª at which time the pawls will move further outwardly to clutchingly engage carrier 30. The drive now continues as an overdrive through the planetary gearing until such time as the speed of motor vehicle travel is sufficiently reduced to cause the springs 44ª to move the pawls inwardly and urge the pawl end portions 43ª outwardly. As before, the pawl release from slots 32ª will be quickly accompanied by synchronization of the rotational speeds of the driving and driven shafts accompanied by engagement of the pawl end portions 43ª in the slots 47ª of the driven shaft cylindrical extension 25ª.

I do not limit my invention, in its broader aspects, to the particular combination and arrangement of parts shown and described for illustrative purposes since various modifications will be apparent within the teachings of my invention as defined in the appended claims.

I claim:

1. In a centrifugally operated clutch, a rotatable shell having a slot, a rotatable cage mounted on a shaft concentric with the shell and carrying a pawl actuated in one of its directions of movement by centrifugal force, said pawl having an end portion adapted to engage said slot, and a spring acting to move said pawl in opposition to said centrifugal force movement, said pawl having a second portion thereof engaging said shaft for limiting said centrifugal force movement of said pawl.

2. In a centrifugally operated clutch, a rotatable shell having a pawl-receiving slot, a rotatable cage mounted on a shaft concentric with the shell and carrying a pawl actuated in one of its directions of movement by centrifugal force, said pawl having an end portion adapted to engage said slot, and a spring acting to move said pawl in opposition to said centrifugal force movement, said pawl having additional portions thereof respectively engaging said shaft for limiting movement of said pawl in its said directions of movement.

3. In a centrifugally operated clutch, a rotatable shell having a pawl-receiving slot, a rotatable cage mounted on a shaft concentric with the shell and carrying a pawl actuated in one of its directions of movement by centrifugal force, said shaft having a portion thereof extending into said cage, said pawl having an end portion adapted to engage said slot, and a spring disposed between said pawl and shaft so as to react on said shaft portion and yieldingly urge movement of said pawl in opposition to said centrifugal force movement.

4. In a centrifugally operated clutch, a rotatable shell having a pawl-receiving slot, a rotatable cage mounted on a shaft concentric with the shell and carrying a pawl actuated in one of its directions of movement by centrifugal force, said pawl having an end portion adapted to engage said slot, said pawl having a second end portion substantially diametrically opposite the slot-engaging end portion adapted to provide a spring seat, said pawl having an intermediate portion deflected at least partially around said shaft and connecting said end portions together, and a spring acting between said shaft and spring seat.

5. In a centrifugally operated clutch, a rotatable shell having a pawl-receiving slot, a rotatable cage mounted on a shaft concentric with the shell and carrying a pawl actuated in one of its directions of movement by centrifugal force, said pawl having an end portion adapted to engage said slot, said pawl having a second end portion substantially diametrically opposite the slot-engaging end portion adapted to provide a spring seat, said pawl having an intermediate portion surrounding said shaft and connecting said end portions together, and a spring acting between said shaft and spring seat for yieldingly urging movement of said pawl in opposition to said centrifugal force movement.

6. In a centrifugally operated clutch, a rotatable shell having a pawl-receiving slot, a rotatable cage mounted on a shaft concentric with the shell and carrying a pawl actuated in one of its directions of movement by centrifugal force, said pawl having an end portion adapted to engage said slot, said pawl having a second end portion substantially diametrically opposite said slot-engaging end portion and offset therefrom in a direction axially of said shaft.

7. In a centrifugally operated clutch, a rotatable shell having a plurality of pawl-receiving slots, a rotatable cage mounted on a shaft concentric with the shell and carrying a pawl actuated in one of its directions of movement by centrifugal force, said pawl having an end portion adapted to engage one of said slots, said pawl having a second end portion substantially diametrically opposite said slot-engaging end portion and offset therefrom in a direction axially of said shaft, and a second pawl carried by said cage, said second pawl having substantially diametrically opposite axially offset end portions one of which is adapted for engagement in another of said slots.

8. In a centrifugally operated clutch, a rotatable shell having a plurality of pawl-receiving slots, a rotatable cage mounted on a shaft concentric with the shell and carrying a pawl actuated in one of its directions of movement by centrifugal force, said pawl having an end portion adapted to engage one of said slots, said pawl having a second end portion substantially diametrically opposite said slot-engaging end portion and offset therefrom in a direction axially of said shaft, and a second pawl carried by said cage, said second pawl having substantially diametrically opposite axially offset end portions one of which is adapted for engagement in another of said slots, said slot-engaging end portions of said pawls being disposed for movements in opposite directions substantially in a plane perpendicular to the axis of said shaft.

9. In a centrifugally operated clutch, a rotatable shell having a pawl-receiving slot, a rotatable cage mounted on a shaft concentric with the shell and carrying a pawl actuated in one of its directions of movement by centrifugal force, said pawl having an end portion adapted to engage said slot, said pawl having a second end portion substantially diametrically opposite said slot-engaging end portion and offset therefrom in a direction axially of said shaft, and a spring intermediate said shaft and offset pawl portion.

10. In a centrifugally operated clutch, a rotatable shell having a pawl-receiving slot, a rotatable cage mounted on a shaft concentric with the shell and carrying a pawl actuated in one of its directions of movement by centrifugal force, said pawl having an end portion adapted to engage said slot, said pawl having a second end portion substantially diametrically opposite said slot-engaging end portion and offset therefrom in a direction axially of said shaft, and a second rotatable shell having a slot adapted to receive said second end portion of said pawl.

11. In a centrifugally operated clutch, a rotatable shell having a pawl-receiving slot, a rotatable cage mounted on a shaft concentric with the shell and carrying a pawl actuated in one of its directions of movement by centrifugal force, said pawl having an end portion adapted to engage said slot, said pawl having a second end portion substantially diametrically opposite said slot-engaging end portion and offset therefrom in a direction axially of said shaft, and a second rotatable shell having a slot adapted to receive said second end portion of said pawl, the slots of said shells being relatively spaced in a direction axially of said shaft.

12. In a centrifugally operated clutch, a rotatable shell having a plurality of pawl-receiving slots, a rotatable cage mounted on a shaft concentric with the shell and carrying a pawl actuated in one of its directions of movement by centrifugal force, said pawl having an end portion adapted to one of said slots, said pawl having a second end portion substantially diametrically opposite said slot-engaging end portion and offset therefrom in a direction axially of said shaft, and a second pawl carried by said cage, said second pawl having substantially diametrically opposite axially offset end portions one of which is adapted for engagement in another of said slots, and a second rotatable shell having a plurality of slots adapted to receive the end portions of said pawls which are substantially diametrically opposite said slot engaging end portions aforesaid.

13. In a centrifugally operated clutch, a rotatable shell having a pawl-receiving slot, a drive-transmitting shaft, a rotatable cage mounted on said shaft concentric with said shell, a pawl carried by said cage and actuated in one of its directions of movement by centrifugal force into clutching engagement with said slot when said cage and shell are rotated in synchronism at or above a predetermined speed, and a spring having inner and outer end portions, the outer spring portion thrusting on said pawl in opposition to said centrifugal force movement, the inner end portion of said spring being seated directly on said shaft to take the reaction of the spring.

WILLIAM T. DUNN.